United States Patent
Savegnago

(10) Patent No.: US 6,290,855 B1
(45) Date of Patent: Sep. 18, 2001

(54) DEVICE FOR AERATING A BODY OF WATER, METHOD FOR AERATING A BODY OF WATER

(76) Inventor: Donald J. Savegnago, 1111 Delles Rd., Wheaton, IL (US) 60187

(*) Notice: Subject to any disclaimer, the term of this patent is extended or adjusted under 35 U.S.C. 154(b) by 0 days.

(21) Appl. No.: 09/140,943

(22) Filed: Aug. 27, 1998

(51) Int. Cl.[7] .................................. B01F 3/04; C02F 7/00
(52) U.S. Cl. .......................... 210/747; 210/170; 210/220; 261/77; 261/123
(58) Field of Search ............................. 261/77, 120, 123, 261/121.1; 210/220, 747, 170

(56) References Cited

U.S. PATENT DOCUMENTS

| | | | |
|---|---|---|---|
| 2,957,495 | * | 10/1960 | Ashbrook . |
| 3,446,488 | * | 5/1969 | Mail . |
| 4,169,873 | * | 10/1979 | Lipert . |
| 4,293,506 | * | 10/1981 | Lipert . |
| 4,702,830 | * | 10/1987 | Makino et al. . |
| 4,752,421 | * | 6/1988 | Makino . |
| 4,911,838 | * | 3/1990 | Tanaka . |
| 5,049,320 | * | 9/1991 | Wang et al. . |
| 5,376,311 | * | 12/1994 | De Guzman . |
| 5,529,701 | * | 6/1996 | Grisham et al. . |
| 5,591,348 | * | 1/1997 | Felder et al. . |
| 5,705,060 | * | 1/1998 | Robberts . |
| 5,755,976 | * | 5/1998 | Kortmann . |
| 6,017,020 | * | 1/2000 | Baughman et al. . |

FOREIGN PATENT DOCUMENTS

965706 * 8/1964 (GB) .

* cited by examiner

Primary Examiner—Thomas M. Lithgow
(74) Attorney, Agent, or Firm—Cherskov & Flaynik

(57) ABSTRACT

An aerator for a body of water is disclosed comprising a structure for forming a column of water wherein the column has a longitudinally extending core devoid of water and a structure for injecting oxygenated fluid into the core. Also provided is a method for forming a column of water wherein the column has a longitudinally extending core devoid of water and injecting oxygenated fluid into the core so that the water is contacted with the oxygenated fluid only from points within the core.

8 Claims, 3 Drawing Sheets

DEVICE FOR AERATING A BODY OF WATER, METHOD FOR AERATING A BODY OF WATER

BACKGROUND OF THE INVENTION

1. Field of the Invention

This invention relates to water aeration and more specifically this invention relates to a device for aerating surface water.

2. Background of the Invention

Bodies of surface water, either manmade or naturally occurring, maintain their viability partly by their physical interaction with elements of the environment. Such interaction includes aeration and agitation caused by wind movement, fish and animal activity, seasonal inversions and in-rushing water from underground springs.

Oftentimes however, surface waters suffer eutrophic conditions due to low oxygen, high carbon dioxide levels. Eutrophic conditions occur for a number of reasons, including the existence of a high biological load whereby organisms use more oxygen and create more carbon dioxide than fauna create and utilize, respectively. Eutrophic waters also result from "still" water conditions wherein oxygenation is initially low due to shelter from wind, or due to a lack of water ingress or egress. Once a eutrophic condition establishes itself, an explosion of surface vegetation occurs, such as algae. With the algae comes an exacerbation of the problem inasmuch as air-exchange with the water surface is further inhibited, as is the penetration of oxygen-generating sunlight (via photosynthesis) to lower water depths.

Low oxygen conditions also can be caused by freezing of surface waters. In such situations, sunlight needed to drive oxygen-producing photosynthesis occurring in water fauna is reduced, as is aeration caused by surface winds. Winter kill of fish due to low dissolved oxygen (DO) levels is common, particularly in northern climes.

Also, treatment of organic waste in surface waters, such as what occurs in municipal sanitation systems, requires the introduction of appreciable amounts of oxygen. Without such oxygen injections, eutrophic conditions abound due to high biological load of degrading bacteria.

A myriad of methods for aerating surface waters have been utilized in efforts to eliminate or at least minimize low oxygen environs as described above. However, most of these methods utilize complex systems for mixing air and water. Typical of such systems are U.S. Pat. Nos. 4,906,363; 4,828,696; and 4,702,830, all granted to Makino et al. In such designs, air is pumped into a chamber designed to create intermittent bubbles of air encased in a tube (with the diameter of the tube being the same as that of the bubbles). As the bubbles rise to the water surface they push upwards water trapped in the tube above these bubbles.

U.S. Pat. No. 4,687,494 granted to Escobal discloses a system for water agitation that utilizes pumping of both water and air. Similarly, U.S. Pat. No. 4,522,151 granted to Arbisi discloses a device wherein fine bubbles of air are produced within a conduit through which the water is being pumped.

A water pump is utilized in U.S. Pat. No. 3,563,641 granted to Eron, wherein the pump is floating on the surface of the pond. Stream aerators also exist (e.g. U.S. Pat. No. 3,489,396 granted to D'Aragon) and are designed for high velocity fluid flow.

A common disadvantage inherent with many of the devices discussed above is that waste-laden water must traverse intricate pumps and other mechanisms and passageways to ultimately become aerated. These intricate structures are easily obstructed or fouled by icing or by waste carried by the water. The systems can be further damaged by suspended solids and even chemicals found in the water.

A need exists in the art for a simple device for aerating surface waters in all seasons. The device should be constructed with off-the-shelf componentry and be easily maintained, even in the most eutrophic conditions. The device should incorporate no intricate componentry with its design embodying few if any moving parts, turbines or gate valves.

SUMMARY OF THE INVENTION

It is an object of the present invention to provide a water pond aerator that overcomes the disadvantages of the prior art.

Another object of the present invention is to provide an aerator that does not require a water pump. A feature of the present invention is that water movement is effected by means of high-pressure air injected along the longitudinal axis of a conduit wherein water is allowed to flow. An advantage of the present invention is that the pump-less design provides a the low-maintenance system not prone to fouling or damage, even when water to be aerated contains high levels of suspended solids and vegetation.

Yet another object of the present invention is to provide an aerator which oxygenates water in a range of flow rates. A feature of the present invention is the formation of a column of water with the longitudinal axis of the column defining a core devoid of water. Another feature of the invention is that oxygenating fluid is injected into the column of water only from points within the core. An advantage of the invention is that water flows vertically upwards along the walls of a cylindrical conduit defining the shape of the column and as a result of the direction of application of the injected oxygenated fluid so that solely the velocity of the oxygenated fluid determines the rate of intake of water into the aeration device. Another advantage of the present invention is that the vertical wall of the conduit acts as a support for the upward flowing water, and therefore confers frictional interaction between the water and the device, thereby extending the residence time of the water in the oxygenation zone.

A further object of the present invention is to provide an aerator containing no moving parts. A feature of the invention is that a column of water, defined by the configuration of the aerator, is propelled upwardly by a longitudinally extending inner core of oxygenated fluid. An advantage of the invention is that water circulates through the aerator without confronting any moving obstructions.

Yet another object of the present invention is to provide an aerator that can be used at different depths of a fluid requiring oxygenation. A feature of the present invention is that it comprises detachable conduits whose length can be varied. An advantage of the present invention is that it can be used in many different bodies of water.

Another object of the present invention is to provide an aerator such that a multiplicity of replicas thereof can be deployed over the surface of a pond while utilizing but one shore-based power-driven unit. A feature of the present invention is that its functioning requires only high pressure air supplied by an external blower. An advantage of the present invention is that a single such shore-based unit may supply several aerators.

In brief, the invention provides an aeration device comprising a means for forming a column of water, wherein the column has a longitudinally-extending core devoid of water; and a means for contacting oxygen with the water.

The invention also provides an aerator for a body of water having a surface, said device comprising means for injecting high pressure air in said aerator in such a manner that water is made to flow continuously without recourse to a water pump.

Also provided is an aerator for a surface of a body of water comprising a conduit for confining water to a longitudinal passage way, said conduit having an axis, a first end, a second end and a region intermediate the first and second ends; means for injecting high pressure air in the intermediate region and along the axis of said conduit in such a manner that the air forms a longitudinally-extending air core coaxial to the passageway; and means to maintain the axis of the aerator in a substantially vertical orientation.

A method for aerating water is provided comprising forming a column of water wherein the column has a longitudinally extending core devoid of water; and injecting oxygenated fluid into the core so that the water is contacted with the oxygenated fluid only from points within the core.

BRIEF DESCRIPTION OF THE DRAWING

The present invention together with its objects and advantages may best be understood from the following detailed description of the embodiment of the invention illustrated in the drawing, wherein.

DETAILED DESCRIPTION OF THE INVENTION

Generally, the invention provides a new submersible device for aerating surface water but without the incorporation of moving parts. The invented aerator can be used in lakes, ponds, rivers, streams, reservoirs, other water retention areas such as those adjacent to parking areas, and decorative or recreation pools.

Figure 1:
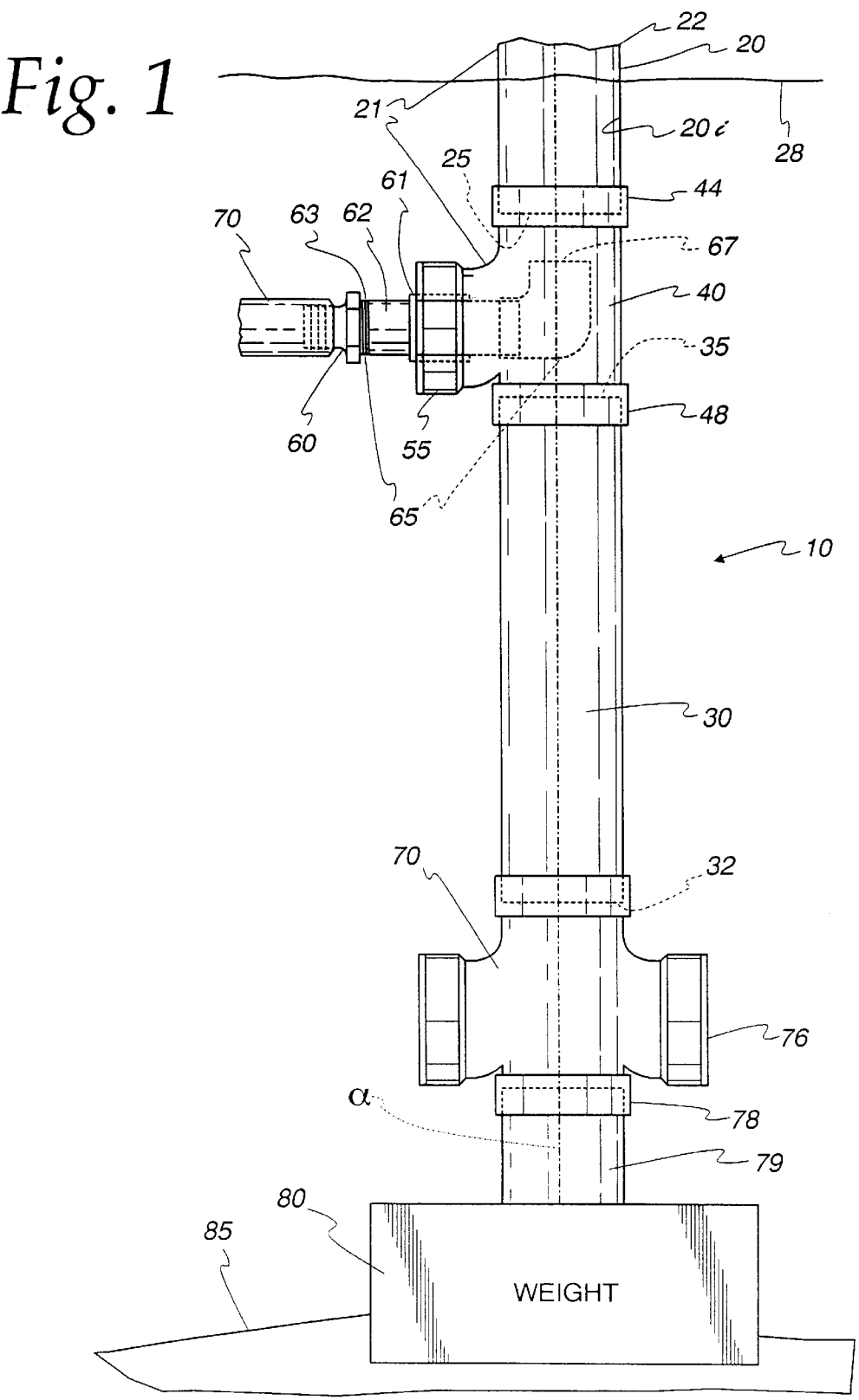
FIG. 1 is an elevational view of an exemplary embodiment of the invention, in accordance with features of the present invention.

An exemplary embodiment of the invented device is depicted in FIG. 1 as numeral 10. As depicted in FIG. 1, the device is nearly completely submerged below a water line 28. Generally elongate in design, the device partially comprises a series of conduits 20, 30 which are co-axially arranged to each other along their longitudinal axes and substantially perpendicular to the water line, to form a elongated water/air mixing chamber 21. At a depending end of the device, and preferably at a lower-most conduit, is an intake means 76 for allowing water to enter the device. Intermediate the water intake means 76 and the water surface 28 is a means 65 for directing air along an internal longitudinal axis a of the device.

The device aerates water by mixing a column of air, coaxially applied to a column of water formed by the conduit, to force the water toward the water surface and out of the device. A salient feature of the aeration process is that the column of air is surrounded by the upwardly traveling water so that the column of air and an inner surface 20i of the conduit 20 forms an annular passage through which the upward-traveling water traverses.

In the illustrated embodiment, the aerator 10 comprises two cylindrical conduits, a top or first conduit 20 and a bottom or second conduit 30. While the conduits can be of dissimilar diameters, for the sake of illustration, the two conduits are shown having similar diameters. The lengths of conduits 20 and 30 are chosen so that a first end 22 of the top conduit 20 remains above or near the water level 28.

An upwardly directed conduit, proximal to the means for injecting air 65 into the device, must be at least 12 inches (30 cm) long in order for the aerator to provide adequate aeration. However, its length cannot exceed the height of a water column whose pressure equals that of the pressure of the air that is supplied to the aerator. As such, maximum lengths of the top conduit will vary with the type and strength of air pump utilized in the device. In FIG. 1, the upwardly directed conduit is the first conduit Conduits positioned below the air injection means 64, such as a downwardly directed proximal (relative to the injection means) conduit 30, which in FIG. 1 is the only downwardly directed proximal conduit illustrated, can be of arbitrary length, so long as the depth conditions stated in the previous paragraph, are achieved.

Generally, the aerator depicted in FIG. 1 is adjustable so that either or both of the conduits 20 and 30 can be removed and replaced with longer or shorter conduits to accommodate deeper or shallower ponds. In the alternative, either or both of the conduits may be replaced by coaxial telescoping assemblies the total length of which can be adjusted by means of set screws, pvc glue, pins, or non-corrosive split rings.

Air Injection Means Detail

The conduits are coaxially joined along their longitudinal axes by a T-junction 40 which also serves as a housing for an upwardly directed second end 67 of the air injection means 65. The T-junction comprises two annular regions, an upwardly directed (i.e. toward the water surface) annular region or fitting 44 and a downwardly directed (i.e., away from the water surface 28) annular region or fitting 48. The upwardly directed fitting 44 is adapted to receive a depending end 25 of the upwardly-directed proximal conduit 20.

Likewise, the downwardly-directed fitting 48 is adapted to receive an upwardly directed end 35 of the downwardly extending proximal conduit 30.

The conduit ends attach to the T-junction snugly but removably. A myriad of attachment means are suitable including a male-female arrangement, whereby the conduits are longitudinally received by each of the fittings in a friction fit arrangement. Instead of utilizing a friction fit, each of the inside surfaces of the annular regions of the T-junction may be provided with a female helical thread and each of the conduit ends 25 and 35 with a matching male helical thread. Thirdly, the conduits may be cemented to, or into, the T-junction.

Yet another conduit-T-junction fastening means alternative is a clamping arrangement. This arrangement is particularly useful where the diameters of the conduit ends and the diameter of the fittings of the T-junction are the same. In this instance, a third bridging conduit, such as flexible tubing, is utilized and clamped at both of its ends to the conduit and T-junction fitting respectively to effect a seal between the structures.

Air Supply Detail

A third member 55 of the T-junction defines a means for receiving a supply of pressurized fluid containing oxygen. A myriad of oxygen-containing fluids can be utilized as an oxygen supply source, including but not limited to air, manmade oxygenated fluid such as pure oxygen or process gases, or even oxygenated liquid associated with biological degradation systems.

In instances where the aeration unit is to be used for the treatment of ponds, lakes or rivers, air is an economical oxygenated fluid.

The oxygenated fluid injection means 65 includes a first end 60 adapted to receive oxygenated fluid and the second end 67, or oxygenated fluid expulsion end, configured to direct the oxygenated fluid a predetermined direction in the mixing chamber 21. Intermediate the first 60 and second 67 ends is a means for removably sealing the injection means to the T-junction 40. A myriad of sealing means are available, including the connection alternatives recited above for attaching the conduits 20, 30 to the T-junction. Another sealing means includes a bushing 61 threadably received by a third annular region 55 of the T-junction. The bushing 62 is adapted to receive and compression fit an oxygenation supply conduit member 62 which lies intermediate the expulsion end 67 and the oxygenating fluid supply receiving end 60 of the injection means 65. The oxygen supply conduit member 62 has a first end 63 juxtaposed to and defining the oxygenating fluid supply receiving end 60. The first end 63 of the oxygenation supply conduit member is adapted to receive a vehicle 70 for directing pressurized oxygenated fluid to the oxygenation fluid injection means 65. One such vehicle can be an air-supply hose.

The seal also must withstand a myriad of pressures at which the oxygenated fluid is supplied to the aeration device 10. For example, when air is used, the injection assembly 65 should withstand air injection volumes of more than 160 cubic feet per minute. Typical volumes range from between 25 and 160 cubic feet per minute.

Pressurized air may be supplied by a shore based commercially available air blower. The blower must provide a pressure of at least 12 in. of water, but blowers with pressures in excess of 50 in providing air flow of 100 cubic feet/min are available. Suitable blowers are those which can enable the device to achieve dissolved oxygen concentrations of at least 5 mg/L and typically between 5 mg/L and 10 mg/L. The high pressure air can be supplied by a commercially available hose, flexibility of the hose being especially desirable if one expects that the aerator will be relocated on the surface of the pond or that the pond level will change appreciably.

Device Placement Detail

A depending end 32 of the downwardly projecting proximal conduit 30 is received by a region of an intake manifold 70 in the same manner as the conduit is received by the T-junction, described supra. The manifold 70 is further provided with regions defining a plurality of openings 76 through which water is admitted into the device 10. These openings may be covered with appropriate netting (not shown) so as to prevent fish or debris from entering the device.

The manifold 70 also comprises a means 78 to removably attach the device to a weight 80 so as to maintain the device in a vertical orientation and, if required, in a fixed position with respect to the bottom 85 of the water body to be aerated. One such means is a depending region 78 of the manifold which slidably and frictionally attaches to a complementary mating surface 79 which in turn is part of a weighted object 80. Alternatively, the depending region 78 can form a spike or other configuration to facilitate being driven or otherwise fastened into or onto the bottom 85 of the body of water. Other means of maintaining the aerator in a predetermined position include permanently setting the depending portion 78 of the aerator in cement or concrete or otherwise affixing the aerator 10 to the bottom of the water body. Generally, either the depending region 78 or its complementary matting surface 79 must be of sufficient length to avoid any silting of the intake orifices 76.

Optionally, a toroidal floater (not shown) may be utilized wherein a portion of the floater is attached to the upper most, upwardly depending conduit (element 20 of FIG. 1) and a second portion of the floater is mated with an anchoring means or weighting means. One or more chains or cables may be used to tie the device to the shore. This latter arrangement has the advantage of allowing one, from a remote location, to move the aerator along the surface of the pond.

A wide variety of materials are suitable for the fabrication of the disclosed invention. For example, the conduits, the T-junction, and manifold can be manufactured from clay, metal, alloy, wood, plastic, fiberglass, nylon, glass, or combinations thereof. A device comprised substantially of polyvinyl chloride material (PVC) exhibits good characteristics. Compatability problems associated with mating different material types are eliminated. In addition, the light weight conferred by PVC-construction enables easier flotation of the device in instances where floaters are employed.

Operation Detail

High pressure air is injected vertically and upwardly into the mixing chamber 21 of the device through the oxygenated fluid expulsion end 67 of the injection means 65. In the instant embodiment, the expulsion end 67 is terminated with an upwardly directed elbow fitting. However, other configurations such as nozzles or high-volume aerating heads and air stones also can be utilized.

The current caused by the rapid evacuation of oxygenated fluid from the expulsion end 67 acts as a pump and drags water, contained inside the immediately surrounding conduit 20, upwardly along the wall of the conduit. This water is replaced by water admitted through the inlet openings 76 so that a continuous flow of water is maintained through the device as long as oxygenating fluid, such as high pressure air is provided. Inlet water volumes will depend on the velocity of the internal oxygenated fluid core traveling upwardly toward the surface of the water body.

Since the oxygenated fluid (e.g. air) flows along the axis only of the upwardly directed, proximally attached conduit (in this case the upper conduit 20), the water flow occupies the full cross-section of conduit 30 but only the outer periphery of conduit 20. To maintain steady state water flow through the device, the velocity of the water in conduit 20 must exceed the velocity in conduit 30. Consistent with the Bernoulli principle, a pressure drop in the proximally attached upwardly directed conduit 20 relative to conduit 30 occurs. This pressure drop allows some of the high pressure air to be absorbed by the water as it leaves the proximal, downwardly depending conduit 30 and flows into the proximal, upwardly depending conduit 20. As noted below, and if the terminating upwardly-directed conduit breaches the water surface 28 of the body of water, ambient air is also contacts the now-treated water as the water spills over the top 22 of the upper-most conduit 20.

Figure 2:
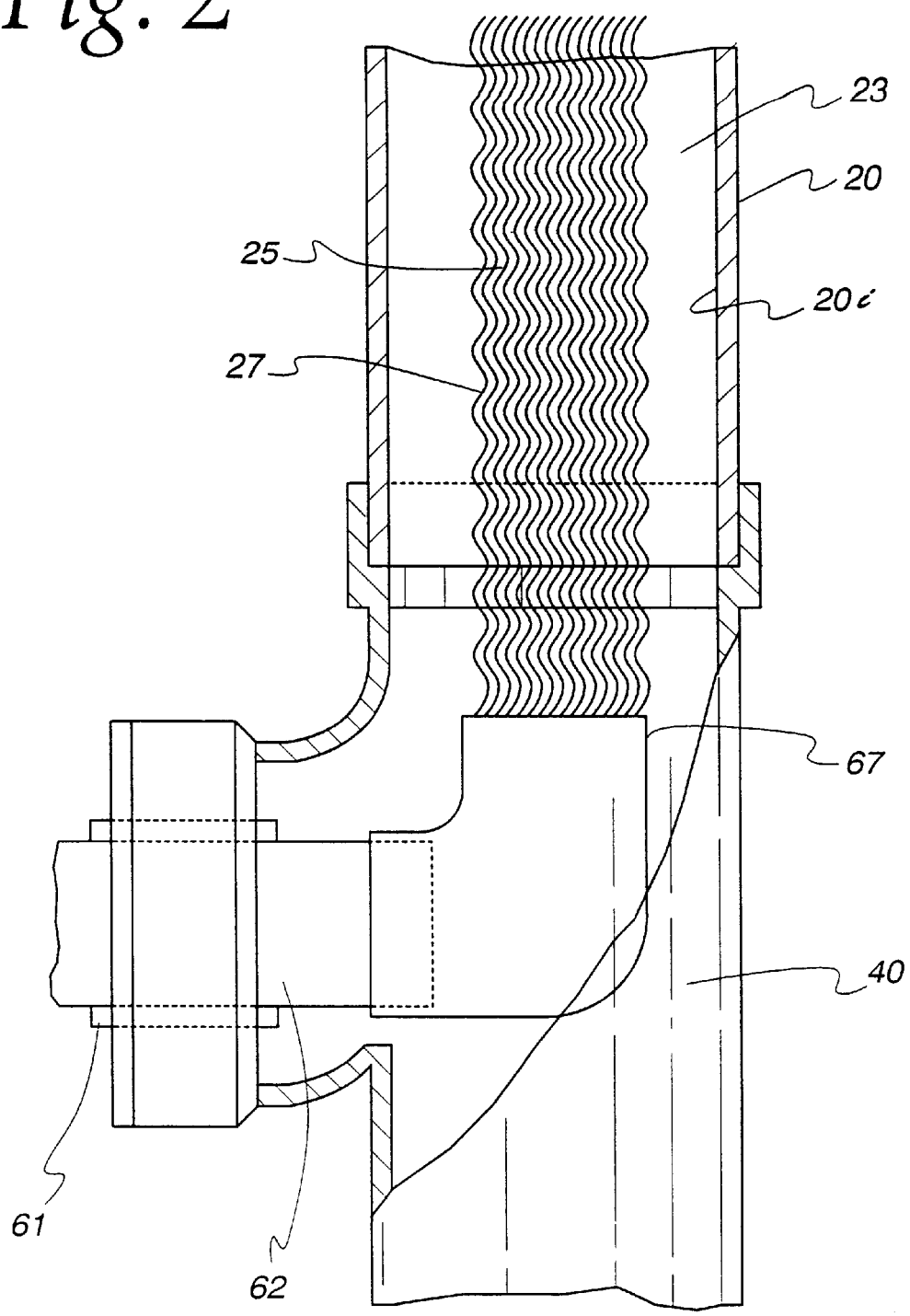
FIG. 2 is a partial cutaway view of the invention.

As can be discerned in FIG. 2, the configuration employed in the present invention provides more stable water flow, compared to state-of-the-art designs. Specifically, previous designs relegated water flow to the longitudinal axis of conduits, with a cordon of air surrounding the water. Previous designs also cause water to ride on air cushions which are propelled upwardly due to buoyant force. These water cushions or bubbles have peripheries in contact with conduit inner surfaces.

The instant design relegates water to an annular space 23 formed between the inner surface 20$i$ of the upwardly-directed proximal conduit 20 and a column of air 25. As such, the water is formed into a column with a hollow core. The outer surface of this column contacts the inner surface 20i of the conduit 20 and as a result, the water column frictionally interacts with the inner surface 20i. Very little if any oxygenating fluid, such as air interacts with the conduit surface defining the boundaries of the mixing chamber.

The water-conduit frictional interaction, combined with the relatively higher mass density of water, slows the velocity of water through the reaction chamber. This in turn causes the water to contact the oxygenated fluid 25 for a longer period of time, thereby improving efficiency of aeration. In addition, inasmuch as the oxygenated fluid is not channeled by a conduit's smooth and rigid walls, a nonuniform water-oxygenated fluid interface 27 results. This further enhances oxygenation and provides axial injection of oxygenated fluid from the core of the water column, which is essentially devoid of water, and into the column of water.

The stability of the water flow in the present invention allows the use of relatively low rates of air flow. This is an important economic consideration because, even for a relatively low level of pollution in a water pond, it may be desirous to maintain aeration continuously for several months and even permanently. Often, aeration is utilized for preventing freezing of the pond, and here again aeration must be maintained continuously for extended periods of time.

The streamlined design in the present invention is particularly advantageous when the pond water has high viscosity, as when the water is near freezing, and/or because it is heavily waste laden.

Once water reaches end 22 it spills over and back into the pond as a turbulent fountain. The fact that in the present invention water flows along the periphery of conduit 20 produces an isotropic and long-range spilling-out of the water at end 22. The high pressure air emanating from the center at conduit end 22 facilitates this radial spilling out by accelerating the water radially. The enhanced spilling out maximizes the absorption of air by the water as it falls back onto the pond surface 28. In contrast, in devices where the air flows along the periphery while the water flows along the axis of the conduit, the water finds its spilling-out impeded by the high pressure air so that much of the water falls back into the conduit.

EXAMPLE

The invented aerator was tested in a pond which was approximately 50 feet long and five feet deep. Original oxygen content of the water therein was approximately 2.8 mg/liter, which is below the minimum oxygen concentration of 5 mg/l required to sustain life. As such, the pond was considered somewhat eutrophic and appeared to have a high level of opaqueness.

Aeration tests with the device utilized a 3105-12 blower (from GAST Manufacturing of Benton Harbor, Mich.) to obtain a pressure equivalent of 42 inches of water. An air flow rate of 43 cubic feet/min was achieved. The air supply hose was a standard 1.5 in hose (such as food grade PVC suction hose) threadably received onto the air injection configuration 64.

For the sake of economics and to preserve the interchangeability features of components of the invention, the upwardly depending conduit section 20 of the device measured 24 inches in length (a standard length) even though the section could have measured up to 42 inches between the air exit point 67 and the top end of the device 22 due to blower strength. Conduits were 4.5 inch diameter PVC conduits.

The proximally attached, depending conduit 30 measured six inches in length. The floater 90 was a 30 inch diameter fiberglass disk.

The inventors measured the water through-put at the upwardly directed end 22 of the proximally connected upwardly directed conduit 20 and found an oxygenated water volume rate of approximately 100 gallons per minute. Oxygen content of the pond improved approximately 300 percent to 9 mg/l after aeration treatment. An oxygen concentration of 8.4 mg/L was achieved 24 hours after the aerator was first applied.

Results will vary with various sizes and kinds of water bodies requiring treatment. For example, a one acre pond may require two or three aerators, a larger area would require the use of several aerators, connected to one or more air sources. Blowers providing 100 cubic feet/min at a pressure equivalent of 55 in of water are commercially available and suitable for treating larger bodies of water. Generally, the inventor has found that increasing air pressure is the most effective way of obtaining quicker aeration.

Figure 3:
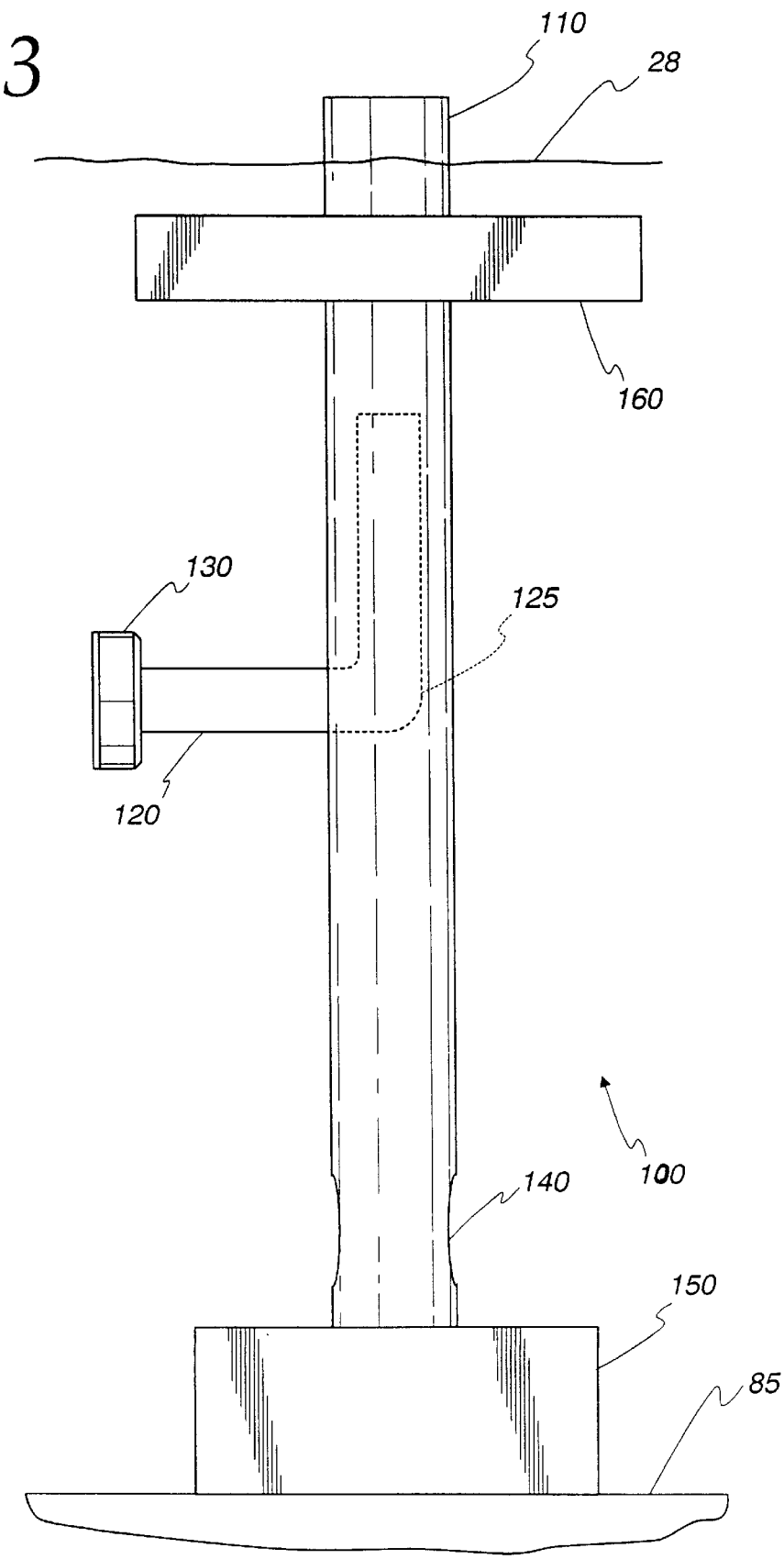
FIG. 3 is an elevational view of an alternate embodiment of the invention, in accordance with features of the present invention.

FIG. 3 depicts a streamlined embodiment of the present invention that is especially suitable for ponds of predetermined depths. The device, generally designated as 100, comprises a single vertical conduit 110 that extends to the surface 28 of the pond. Positioned at the medial portion of the conduit is an air injection tube 120 with a first end and a second end. The second end 122 of the tube 120 defines an upwardly directed right angle bend. Insertion and securement of the tube is effected in a myriad of ways, including providing an aperture through the wall of the conduit that is intermediate the floater 160 and the depending end 131 of the conduit 110. The tube is then slidably received by the aperture and subsequently secured to the conduit wall via adhesive, or some other sealing means.

The first end 121 of the tube contains an air hose fitting 130 which is adapted to receive an air supply house (not shown).

In operation, the high pressure air is directed upwardly along the axis of the conduit by means of the right angle bend 125 in the tube 120. The lower end of the conduit has been provided with a plurality of water inlets 140. A weight 150 attached to the depending end 131 of the conduit maintains the device in a vertical orientation and a floater 160 adapted to be slidably received by the conduit 110, is positioned at the end 111 of the conduit adjacent to the water surface 28. The floater is positioned to maintain the device near the surface 28 of the pound.

In the alternative, the device may be anchored permanently to the bottom 85 of the pond. This device operates in the same manner as the embodiment described supra and the same materials are suitable for its manufacture. Both of the above embodiments of the proposed invention perform optimally when the axis of the aerator is vertical. As long as the air column 25 is surrounded by water, the invented device provides suitable results even if its longitudinal axis departs from the vertical.

Finally, where pond depth does not vary significantly, the invention allows for the permanent vertical installation of one or more aerators with high pressure air supplied to the aerators by conduits that are permanently attached to the aerators.

While the invention has been described with reference to details of the illustrated embodiments, these details are not intended to limit the scope of the invention as defined in the appended claims.

What is claimed is as follows:

1. A method for oxygenating a liquid comprising:
   a) forming a column consisting solely of the liquid so that the column defines hollow core coaxial with a longitudinal axis of the column; and
   b) directly contacting the liquid column with a column consisting solely of oxygenated gas located within the core, wherein the column of gas is devoid of water, to create a nonuniform, water-oxygenated fluid interface to propel the liquid upwardly.

2. The method as recited in claim 1 wherein the oxygenated gas is a gas selected from the group consisting of air, oxygen gas, process effluent and combinations thereof.

3. The method as recited in claim 2 wherein the gas is supplied at a volume of from 27 cfm to more than 160 cfm.

4. The method as recited in claim 1 wherein the liquid is moving in a direction parallel to the axis.

5. The method as recited in claim 1 wherein the liquid is oxygenated to a dissolved oxygen content of between 5 milligrams per liter and 10 milligrams per liter.

6. A method for oxygenating a liquid comprising:
   a) forming a column consisting solely of oxygenated gas devoid of water, wherein the column defines a longitudinal axis;
   b) directly contacting water to the column along the longitudinal axis to create a nonuniform, water-oxygenated fluid interface to propel the liquid upwardly.

7. The method as recited in claim 6 wherein said oxygenated gas is air, oxygen gas, process effluent, or combinations thereof.

8. The method as recited in claim 6 wherein the gas is supplied at a volume of from 27 cfm to more than 160 cfm.

* * * * *

UNITED STATES PATENT AND TRADEMARK OFFICE
CERTIFICATE OF CORRECTION

PATENT NO.      : 6,290,855 B1
DATED           : September 18, 2001
INVENTOR(S)     : Savegnago It is certified that error appears in the above-identified patent and that said Letters Patent is hereby corrected as shown below:

<u>Column 9,</u>
Line 4, insert -- a -- between "defines" and "hollow".

Signed and Sealed this

Twelfth Day of March, 2002

*Attest:*

JAMES E. ROGAN
*Attesting Officer*     *Director of the United States Patent and Trademark Office*